Figure 1:
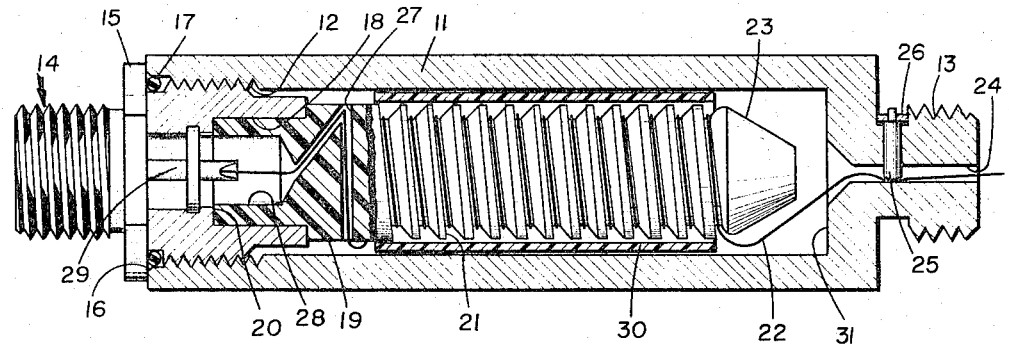

Ralph H. Murphy
INVENTOR.

BY
ATTORNEY.

AGENT.

United States Patent Office 3,302,108
Patented Jan. 31, 1967

3,302,108
APPARATUS FOR MEASURING THE VELOCITY AND DISTANCE BETWEEN BODIES DURING THE SEPARATION THEREOF
Ralph H. Murphy, Mogadore, Ohio, assignor, by mesne assignments, to the United States of America as represented by the Secretary of the Navy
Filed Apr. 16, 1964, Ser. No. 360,467
4 Claims. (Cl. 324—70)

This invention relates to apparatus pertaining to the measurement of the distance between two separating bodies and the velocity of separation of the two bodies. The apparatus of the invention is of particular usefullness in monitoring the distance between two aerial bodies, such as a missile warhead and a spent rocket motor during the separation stage and determining the speed at which the separation is taking place for the purpose of turbulence analysis and other performance characteristics studies and, although hereinafter described with reference to such use, it is to be understood that this specific application is merely illustrative.

In the past separation of a missile from its booster has been detected by means interconnecting the two bodies and actuated upon the separation thereof such as, for example, a circuit in the missile including a switch spring-biased in the open position and adapted to be closed upon withdrawal of the booster and a switch actuating wire or rod connected thereto a predetermined distance from the missile. Although such devices have served the purpose, they have not proved entirely satisfactory for the reason that they provide only a single point on a time-history curve, indicating to the monitor only that the booster and missile are at least a given distance apart. They do not provide a continuous time-history, i.e., a continuous record of the separation distance from the time when separation is initiated to the time when the booster and missile are separated by a preselected distance. Accordingly, analysis of the operation, especially relative to the speed at which separation takes place, is impossible with prior arrangements.

Therefore, it is an object of this invention to provide simple and reliable apparatus for monitoring the separation distance and the velocity of separation of two bodies.

It is another object of this invention to provide simple and reliable apparatus which will accomplish monitoring of the separation distance and the velocity of separation of two bodies.

It is still another object of this invention to provide a novel separation monitor for continuously measuring the distance between two separating bodies over a predetermined range and for determining the speed at which the separation takes place.

It is yet another and more specific object of this invention to provide an interstage separation monitor for use in analyzing the separation of a spent rocket motor from a missile which continuously monitors separation distance versus time over a predetermined range of separation.

Briefly, in one form of the invention these objects are achieved by the provision of a threaded rod having resistance wire wound in a single layer in the thread wells so as to spool from the rod end. A vinyl sleeve of the same inside diameter as the threaded rod outside diameter encloses the resistance wire coil to retain the wire when it is not in use and to stabilize the spool-off functioning of coil when it is operational. The rod and vinyl sleeve are inserted into a metal container positioned in the missile casing and the resistance wire at the starting spool end is fed through the wall of the container and connected to the rocket motor or booster. Firm contact with the wire where it passes through the wall of the container is provided by a spring loaded wiper contact and an effective potentiometer is formed by grounding the container case at the wiper contact and supplying a voltage potential at the opposite end of the spool. Current or voltage change at the supply end will measure the amount of resistance remaining as the spool is fed past the wiper contact and if this change is referenced to a recording time base, an effective measurement of the distance separating the missile and booster versus time may be established.

Figure 2:
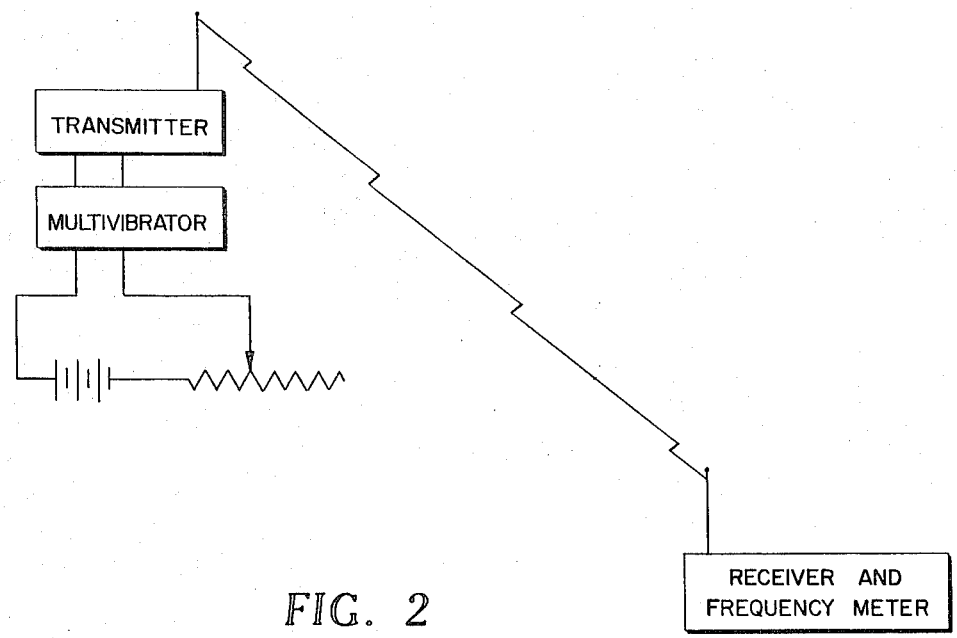

Other objects, advantages and novel features of the invention will become apparent from the following detailed description of the invention when considered in conjunction with the accompanying drawings wherein:

FIG. 1 is a sectional view of a device formed in accordance with the present invention; and FIG. 2 is a schematic view illustrating one form of monitoring system in accordance with this invention.

Referring now to FIG. 1 of the drawing there will be seen an elongated casing 11 having an internally-threaded portion 12 at one end and an externally-threaded portion 13 at the other end thereof, and which is understood to be mounted within the structure of a missile. Threadably engaged with end portion 12 of casing 11 is an electrical connector shell generally indicated by the numeral 14 having a flange 15 which coacts with lip 16 on casing 11 to compress an O-ring sealing means 17 when the connector shell is fully engaged with the casing.

The electrical connector shell 14 is provided with a bore 18 opening into the interior of casing 11 and into which a spindle or rod member 19 composed of Teflon is press-fitted until it seats on shoulder 20. The rod 19 is threaded along the greater part of its length as indicated by the numeral 21 and a flexible resistance element or wire 22 is wound in a single layer in the thread wells so as to spool from the rod end 23 and through an opening 24 in the end wall portion 13 of casing 11. The threads 21 will keep the resistance element or wire 22 from shorting and will provide a winding pattern that is uniform. It is understood, of course, that the resistance element or wire 22 is thereafter connected to the rocket motor or booster. A brass contact pin 25 is held in firm contacting relation with the wire 22 as it feeds through opening 24 by a spring-clip 26 affixed in a groove encircling end portion 13 of casing 11.

Adjacent the opposite end of casing 11 the wire 22 is fed through a slot 27 in rod 19 to a central bore 28 in the end thereof, where it connects with a female insert 29 carried by connector shell 14 and adapted to receive a male contact pin insert (not shown) to complete an electric circuit to a source of power within the missile.

A flexible vinyl sleeve 30 having substantially the same inside diameter as the threaded Teflon rod outside diameter encloses the threaded portion of the spindle or rod 19 to retain the coiled resistance element or wire on the rod while the unit is not in use and to stabilize the spool-off of the wire when the unit is functional. The rod 19 and the vinyl sleeve 30 covering it are so proportioned with respect to the casing 11 as to provide a minimum clearance about the circumference of the assembled spool and a minimum spacing approximating one spool diameter from the starting spool end 23 to the inside wall 31 of the metal container or casing 11. By grounding the container case 11 at the contact 25 and supplying a voltage potential at the opposite end of the spool as hereinbefore described, an effective potentiometer may be formed.

When the rocket motor or booster separates from the missile structure the resistance element or wire 22 will be spooled from the spindle or rod 19 and drawn past wiper contact 25. It should be apparent that the amount of resistance remaining as the wire 22 is fed past the wiper contact 25 may be monitored by observing the current or voltage change at the supply end. If this is transmitted from the missile to a ground station and referenced to a recording time base, an effective measurement of the separation distance versus time may be determined by ground observers.

Referring now to FIG. 2, an example of a means for accomplishing the objectives set forth above and formed in accordance with the teachings of the present invention is illustrated. In this exemplary embodiment, a transistor coupled multivibrator is provided which will produce an A.C. output frequency which is linearly proportional to the D.C. input voltage which in turn is proportional to the resistance remaining on the spool. This signal is transmitted from the missile and the information is picked up by a receiver and frequency meter on the ground.

Since many changes could be made in the above construction and many widely different embodiments of this invention could be made without departing from the scope thereof, it is intended that all matter contained in the above description or shown in the accompanying drawings shall be interpreted as illustrative only and not in a limiting sense.

What is claimed is:

1. Apparatus for measuring the distance between two separating bodies and for determining the speed at which separation is taking place comprising a threaded rod mounted within one of said bodies, a resistance wire wound in the thread wells of said threaded rod, an electrical circuit including said resistance wire, adapted for connection to a source of power and connected at one end to said resistance wire and having a wiper contact connected at a portion remote from said one end of said resistance wire, said other end of said resistance wire being attached to the other of said bodies, means in said circuit for indicating the current flow, and means referencing said current indication with respect to time, for providing an effective measurement of the separation distance of the separating bodies versus time.

2. Apparatus according to claim 1 including a tubular sleeve member enclosing said threaded rod and having an inside diameter substantially equal to the outside diameter of said threaded rod.

3. In an apparatus for monitoring the separation distance and the velocity of separation of two bodies comprising a cylindrical casing mounted within one of said bodies and having an aperture in one end wall thereof, a threaded rod non-rotatably positioned within said casing, a resistance wire wound in the thread wells of said threaded rod and extending through said aperture in said casing end wall, an electrical circuit including at least the wound portion of said resistance wire, means for supplying a source of power for connection to one end of said wound portion of the resistance wire, and a spring loaded wiper contact positioned in said one end wall of said casing and electrically connected with said wound portion of said resistance wire at a predetermined position relative to the other end thereof where it passes through the aperture in said casing end wall, said resistance wire extending through said aperture in the end wall of said casing and being attached to the other of said bodies, whereby the resistance wire is spooled off from the threaded rod as the bodies separate from each other to effect a change of resistance in the remaining portion of said resistance wire in the electrical circuit, tubular sleeve means enclosing said threaded rod and having an inside diameter substantially equal to the outside diameter of said threaded rod for retaining the resistance wire on said rod when the apparatus is not in use and for stabilizing the spool-off when the apparatus is operational, additional means in said circuit for indicating the distance separating the two bodies as a function of the current flow in said circuit, and means for referencing said indication with respect to time thereby to obtain an effective measurement of the velocity of separation.

4. Apparatus according to claim 3, wherein said tubular sleeve means is a flexible vinyl sleeve.

References Cited by the Examiner

UNITED STATES PATENTS

| | | | |
|---|---|---|---|
| 2,415,492 | 2/1947 | Hines | 324—70 |
| 3,246,860 | 4/1966 | Yates | 324—70 |

WALTER L. CARLSON, *Primary Examiner.*

M. J. LYNCH, *Assistant Examiner.*